United States Patent [19]

Walters et al.

[11] Patent Number: 4,822,761
[45] Date of Patent: * Apr. 18, 1989

[54] METHOD AND APPARATUS FOR COOLING FLUID SOLID PARTICLES USED IN A REGENERATION SYSTEM

[75] Inventors: Paul W. Walters; Lloyd E. Busch; Oliver J. Zandona, all of Ashland, Ky.

[73] Assignee: Ashland Oil, Inc., Ashland, Ky.

[*] Notice: The portion of the term of this patent subsequent to Aug. 12, 2003 has been disclaimed.

[21] Appl. No.: 136,234

[22] Filed: Dec. 21, 1987

Related U.S. Application Data

[63] Continuation-in-part of Ser. No. 865,911, May 13, 1986, abandoned, which is a continuation-in-part of Ser. No. 617,764, Jun. 6, 1984, abandoned, which is a continuation-in-part of Ser. No. 532,253, Sep. 15, 1983, abandoned.

[51] Int. Cl.⁴ .................. B01J 38/12; B01J 38/36
[52] U.S. Cl. ........................... 502/38; 502/42; 502/43; 502/44; 208/120; 208/164; 208/113; 208/89
[58] Field of Search ............ 502/38, 42, 43, 44; 208/120, 164, 73, 89, 113

[56] References Cited

U.S. PATENT DOCUMENTS

| | | | |
|---|---|---|---|
| 4,353,812 | 10/1982 | Lomas et al. | 208/164 |
| 4,374,750 | 2/1983 | Vickers et al. | 208/164 |
| 4,405,444 | 9/1983 | Zandona | 208/113 |
| 4,405,445 | 9/1983 | Kovach et al. | 208/113 |
| 4,414,098 | 11/1983 | Zandona et al. | 208/120 |
| 4,578,366 | 3/1986 | Cetinkaya et al. | 208/164 |
| 4,605,636 | 8/1986 | Walters et al. | 208/164 |

Primary Examiner—H. M. S. Sneed
Assistant Examiner—Chung K. Pak
Attorney, Agent, or Firm—Richard C. Willson, Jr.

[57] ABSTRACT

A process for upgrading residual portions of crude oils comprising metal contaminants and Conradson Carbon contributing components by the combination of thermal visbreaking with fluid inert solids and catalytic upgrading of naphtha and higher boiling components of thermal visbreaking in separate systems of riser conversion and solids regeneration is discussed. Heat management of the regeneration systems is restricted in substantial measure by a novel external solids heat exchange apparatus arrangement utilized to partially cool hot regenerated solids utilized in the solids regeneration systems.

4 Claims, 4 Drawing Sheets

METHOD AND APPARATUS FOR COOLING FLUID SOLID PARTICLES USED IN A REGENERATION SYSTEM

This application is a continuation-in-part of U.S. Ser. No. 865,911 filed May 13, 1986, abandoned, which is itself a continuation-in-part of U.S. Ser. No. 617,764, filed June 6, 1984, abandoned, which is itself a continuation-in-part of U.S. Ser. No. 532,253 filed Sept. 15, 1983, abandoned.

BACKGROUND OF THE INVENTION

Crude oil from which desired gaseous and liquid fuels are made contain a diverse mixture of hydrocarbons and other compounds which vary widely in molecular weight and therefore boil over a wide range. For example, crude oils are known in which 30 to 60% or more of the total volume of the oil is composed of compounds boiling at temperatures above about 650° F. Among these are crudes in which from about 10% to about 30% or more of the total volume consists of compounds so heavy in molecular weight that they boil above about 1025° F. or at least will not boil below 1025° F. at atmospheric pressure.

Because these high boiling components of crude oil boiling above 343° C. (650° F.) are unsuitable for inclusion in gasoline or in some higher boiling liquid hdyrocarbon product fuels, the petroleum refining industry has developed processes for separating and/or breaking down the molecules of the high molecular weight, high boiling compounds into smaller molecules which do boil over a more appropriate boiling range. The cracking process which is most widely used for this purpose is known as fluid catalytic cracking (FCC). Although the FCC process has reached a highly advanced state, and many modified forms and variations have been developed, their unifying factor is that a restricted boiling range hydrocarbon feedstock is caused to be cracked in a riser reactor at an elevated temperature in contact with a cracking catalyst that is suspended in the feedback under cracking conditions providing a temperature in the range of about 510° C. to about 593° C. (950° F. to about 1100° F.) at the riser outlet. Upon attainment of a desired degree of molecular weight and boiling point reduction in the catalytic cracking operation the catalyst is separated from the hydrocarbon conversion fuel products.

Crude oils in the natural state contain a variety of materials which deposit troublesome deactivating materials on FCC catalysts. Only a portion of these troublesome materials can be economically removed from the crude oil or from the cracking catalyst. Among these troublesome materials are coke precursors (such as asphaltenes, polynuclear aromatics, etc.), heavy metals (such as nickel, vanadium, iron, copper, etc.), lighter metals (such as sodium, potassium, etc.), sulfur, nitrogen and others. The lighter metals can be substantially removed by desalting operations, which are part of the normal procedure for pretreating crude oil for fluid catalytic cracking. Other materials, such as coke precursors, asphaltenes and the like, tend to break down to form hydrocarbonaceous deposits or coke during the cracking operation, which deposit on the catalyst and thus impair further conversion contact between a hydrocarbon feedstock and the catalyst. The heavy metals in the residual oil feed transfer almost quantitatively from the feedstock to the catalyst surface.

If the catalyst is reused again and again for processing additional heavy residual oil feedstock, which is usually the case, the heavy metals in the feedstock comprising nickel, vanadium, iron and copper accumulate on the catalyst to the point that they unfavorably alter the composition of the catalyst and/or the nature of its catalytic effect upon the feedstock. For example, vanadium tends to form fluxes with certain components of commonly used FCC catalysts, lowering the melting point of portions of the catalyst particles sufficiently so that they begin to sinter, agglomerate and become ineffective cracking catalysts. Accumulations of vanadium and other heavy materials, especially nickel, also "poison" the catalyst. They tend in varying degrees to promote hydrogenation, dehydrogenation and aromatic condensation, resulting in excessive production of carbon and gases with consequent impairment of liquid fuel yield. An oil such as a crude or crude fraction or other heavy oil fraction that is particularly abundant in nickel and/or other metals exhibit similar behavior, also contains relatively large quantities of coke precursors. Such heavy oil feeds are referred to herein as carbo-metallic oil feeds and represent a particular challenge to the petroleum refiner to achieve economic conversion thereof to more useful fuel products comprising gasoline, light and heavy cycle oil products.

Several proposals in the prior art involve treating a heavy oil feed to remove the metal therefrom prior to cracking, such as by hydrotreating, solvent extraction and complexing with Friedel-Crafts catalysts, but these techniques mullify the refined costs and arecriticized as unjustified economically in the present crude oil available environment. A combination cracking process comprising separate "dirty oil" and Clean oil" processing units has been proposed. Still another proposal blends residual oil with gas oil and controls the quantity of residual oil in the mixture in relation to the equilibrium flash vaporization temperature at the bottom of the riser type cracking unit employed in the process. Still another proposal subjects the feed to a mild preliminary hydrocracking or hydrotreating operation before it is introduced into the cracking unit. It has also been suggested to contact a carbo-metallic oil such as reduced crude with hot toconite pellets to produce gasoline. This is a small sampling of the many proposals which have appeared in the patent literature and technical reports.

Notwithstanding the great effort which has been expanded and the fact that each of these proposals overcomes some of the difficulties involved, conventional gas oil FCC practice today bears mute testimony to the dearth of carbo-metallic oil-cracking techniques that are both economical and highly practical in terms of technical feasibility. Some crude oils are relatively free of the high boiling coke precursors or heavy metals or both. The troublesome components of crude oil are for the most part concentrated in the highest boiling fractions thereof. Accordingly, it has been possible heretofore to largely avoid the problems of Conradson carbon coke precursors and heavy metals accumulation by sacrificing some liquid fuel yield potentially available from the highest boiling vacuum bottom portions of crude oils. More particularly, the more conventional gas oil FCC practice has employed as a part of the gas oil feedstock that fraction of crude oil which boils at about 343° C. (650° F.) up to about 538° C. (1000° F.) but absent vacuum bottoms material. Such fractions are thus relatively free of heavy metal and Conradson carbon contamination. Such feedstock comprising atmospheric and "vacuum gas oil" (VGO) is generally prepared from crude oil by distilling off the atmospheric gas oil fraction or middle distillate boiling below about 600° or 650° F. at atmospheric pressure and then separating by vacuum distillation vacuum gas oils boiling from about 600° or 650° F. up to about 1000° or 1025° F. end boiling point.

A gas oil of atmospheric distillation boiling above 600° F. (316° C.) and/or vacuum distillation gas oils are used as the feedstock for conventional gas oil FCC processing. The heavier vacuum resid or vacuum bottoms product of crude oil distillation is normally employed in a variety of other purposes, such as for the production of asphalt, residual fuel oil, #6 fuel oil, or marine Bunker C fuel oil. This vacuum resid is now considered to represent a great waste of the potential value of this bottom portion of the crude oil, especially in light of the great effort and expense which the art has been willing to expend in the attempt to produce generally similar materials from coal and shale oils.

The present invention is concerned with the upgrading of residual oil comprising light and heavier gas oils and the heavier fractions of crude oils containing substantial quantities of coke precursors, heavy metals, and other troublesome residual components under operating conditions thereby increasing the overall yield of gasoline and other desired liquid fuels from a given crude oil. The method and apparatus of this invention is uniquely advantageous in several respects for upgrading high boiling carbo-metallic residual oils in a technically advanced manner to achieve thermal upgrading of poor quality feed more suitable for zeolite catalytic cracking thereof and the regeneration of fluid solid particles used in the combination operation for the purpose herein discussed.

In general, the coke-forming tendency of an oil can be ascertained by determining the weight percent of carbon remaining after a sample of that oil has been pyrolized. The industry accepts this carbon value as a measure of the extent to which a given oil tends to form non-catalytic coke when employed as feedstock in a catalytic cracker. Two established tests are recognized, the Conradson Carbon ASTM Method D189 and Ramsbottom Carbon tests, described in ASTM Test No. D524-76. In conventional gas oil FCC practice, Conradson Carbon values generally less than 2 and Ramsbottom Carbon values on the order of about 0.1 to about 1.0 are regarded as indicative of an acceptable gas oil feed. The present invention is concerned with the use of hydrocarbon feedstocks which have higher Conradson Carbon values in the range of 2 to 12 and higher Ramsbottom Carbon values above 1.0 and thus provide substantially greater potential for coke formation than is more usually obtained with gas oil FCC feeds of less than 2 Conradson Carbon value.

According to the more conventional prior art FCC practice, the heavy metal content of a feedstock for FCC processing is limited to a relatively low value, e.g., about 0.25 ppm Nickel Equivalents (nickel plus vanadium) or less. The present invention is concerned with the processing of feedstocks containing a concentration of metal contaminants substantially in excess of this value, and which therefore have a significantly greater potential for rapidly accumulating on and poisoning of the catalyst beyond economic recovery thereof.

In conventional FCC practice in which a circulating inventory of catalyst is used again and again in the processing of fresh gas oil feeds with periodic or continuing addition of fresh catalyst and withdrawal of equilibrium catalyst, the metal content of the catalyst is maintained at a level which may for example, be in the range of about 200 to about 600 ppm Nickel Equivalents. The process of the present invention is concerned with the use of catalyst having accumulated a substantial amount of metals, and which therefore have a much greater than normal tendency to promote undesired reaction of dehydrogenation, aromatic condensation, gas production or coke formation. A high metals accumulation of 1000 to 3000 ppm is normally regarded as quite undesirable in FCC processing.

The composition and molecular structure of hydrocarbon components comprising residual portions of crude oils and particularly that portion thereof referred to as vacuum resid affects substantially that level of hydrocarbonaceous material deposited on solids used to thermally and/or catalytically upgrade the residual oil feed to form liquid fuel products comprising gasoline. Thus, the higher the molecular weight, the higher the Conradson Carbon value of the feed and thus the higher will be the deposition of hydrocarbonaceous material on the fluid solid particles. The catalytic processing of feeds comprising components boiling above about 1025° or 1050° F. and comprising the vacuum resid portion of a hydrocarbon feed necessarily will increase the deposition of the carbonaceous material on the fluid solid particles during residual oil conversion. This deposition of carbonaceous material comprising hydrogen and more usually referred to simply as coke, deactivates the catalyst particles. The removal of deposited carbonaceous material from catalyst is accomplished by combustion in a separate regeneration system provided for the purpose.

It is well known that an increase in the level of coke deposition on catalyst particles will increase the combustion temperature encountered unless appropriate precautions are taken. This may be controlling by reducing, for example, the catalyst circulation rate by reducing the oxygen concentration of the combustion supporting gas, by using higher temperature particles, by providing indirect heat exchange means within the bed of solids in the combustion zone and combinations of the above. The patents of Medlin et al, Nos. 2,819,951; McKinney 3,990,992; and Vickers 4,219,442 disclose fluid catalytic cracking processes using dual combustion zone regenerators with cooling coils in particularly the second regeneration zone. The use of catalyst coolers which are external to the regeneration or coke combustion zone is also known in the prior art. Some of these patent disclosures include Harper Nos. 2,970,117; Owens 2,873,175; McKinney 2,862,798; Walson et al 2,596,748; Jahnig et al 2,515,156; and Berger 2,492,948.

The present invention on the other hand departs in several respects from the disclosure of the prior art by providing catalyst regeneration systems considered more suitable for the combustion removal of high levels of carbonaceous material deposits of residual oil conversion from fluid particles such as relatively inert and/or catalyst particles in temperature controlled environments contributed in part by the special design of the regeneration system employed in combination with an external catalyst cooler. The cooler design of this invention is used in conjunction with one or more stages of catalyst regeneration as hereinafter more particularly described.

SUMMARY OF THE INVENTION

The present invention is concerned with the conversion of the higher boiling portions of crude oils known as residual oils and/or resids recovered with the bottoms product of atmospheric and/or vacuum distillation and containing substantial quantities of coke precursors and heavy metal contaminants, sulfur and nitrogen compounds. The combination process of this invention involves a unique sequence of operations designed to dispose of and/or handle the undesirable components of reduced crudes in a manner permitting conversion of high boiling hydrocarbon components in association therewith to more desirable gaseous and liquid fuel porducts.

The unique combination operation relies upon the use of a solid particulate substantially catalytically inert (sometimes called "sorbents") in combination with solid catalyst particles preferably of low coke producing characteristics such as one comprising an ultrastable crystalline zeolite dispersed in a matrix composition with or without cracking activity. Preferably the matrix is an organic metal oxide composition known in the art and providing some cracking activity under the conditions employed.

The combination of solid particulates are maintained under temperature, pressure and space velocity conditions selected to effect thermal visbreaking of feed materials boiling above 650° F. and comprising multi-ring compounds of naphthalenes, asphaltenes and porphyrins to form lower orders of carbon-hydrogen ring structures of lower molecular weight more susceptable to zeolite catalytic cracking in the formation of liquid fuel products comprising gasoline light cycle oil or heavier fuel oil products.

The integrated combination of solids utilization comprising inert and catalytic solids effectively disperse metal contaminants of nickel and vanadium and Conradson carbon producing components among the solids in a manner permitting a more effective and selective upgrading of the charged residual oil feed, passivation of of deposited metal contaminants is effected in substantial manner by the addition of one or more compounds selected from the group consisting of antimony, titanium, alumina and zirconium. A recovery of generated heat in an effectively useable form is also particularly recovered from carefully monitored solids regeneration systems of restrained temperature operations particularly promoting the useful on-stream life of the solids employed against hydrothermal deactivation of desired fluid solids characteristics associated with surface area, pore volume, metals accumulation, thermal and catalytic cracking activity and selectivity.

Of particular importance in the heat dissipation or heat management aspect of the combination operation is the utilization of a solids cooler means external to the solids regeneration systems to produce process required steam and serving to maintain more selective and restrained temperature profiles in the exothermic combustion zones of the combination process, whereby produced CO may be also recovered and used to provide process required steam.

This invention is concerned in another aspect withthe catalytic conversion of a partially decarbonized residual portion of crude oils depositing substantial levels of Conradson carbon material on catalyst particles effecting catalytic conversion thereof which is thereafter removed by combustion. More particularly, the present invention is concerned with a technique for effecting a controlled removal of hydrocarbonaceous materials from inert or catalyst particles. More particularly combustion of carbonaceous material on catalyst particles is accomplished in at least two separate stages of combustion of selected and restricted temperature limits accomplished by passing a partially regenerated and cooled catalyst product of a first stage of catalyst regenerated to a second stage of regeneration providing for removal of residual coke substantially free of hydrogen by combustion in a temperature environment preferably less than about 1500° F. In yet another aspect, the present invention is related to a fluid particle external heat exchange design used in a single or two stage regeneration system to maintain a temperature restricted environment therein and particularly in the second stage of a catalyst regeneration system.

The external fluid catalyst cooler of this invention comprises a large vertically elongated cylindrical zone or chamber open in the upper end thereof and in direct communication with a upper fluid bed of solid particles which are either inert or catalytic. A bottom portion of said large cylindrical zone is provided with two separate vertically spaced apart but adjacent header sections or zones which extend across said large cylindrical zone. A plurality of substantially vertical elongated open end first conduits means of selected spaced apart arrangement provided throughout the cylinder cross section extend from a bottom header section upwardly through a separate upper header section adjacent thereabove and into an upper portion of said cylindrical zone comprising downflowing solid particles. A second elongated coaxially aligned conduit means of larger diameter than said first conduits and closed at an upper end thereof provides a separate annular passageway with said first conduit. Said annular passageway of each of said first and second conduit arrangement is in open communication at the bottom thereof with the upper horizontal header section provided in a lower portion of said large cylindrical zone. The upwardly extending plurality of elongated conduit combinations comprising said first and second conduit means are spaced from one another horizontally a selected distance sufficient to provide space for downward relatively dense flow of fluidized solid particles of an average particle size within the range of about 20 to about 150 microns. The downwardly flowing solid particles are indirectly cooled by heat exchange with a heat exchange fluid passing first upwardly and then downwardly through said vertical tube arrangement. Partially cooled fluid solids are withdrawn from a low side of said large cylindrical chamber above said uppermost header chamber for passage to a solids regeneration operation.

In order to assist with fluid-like downflow of fluid solid particles through the cylindrical heat exchange chamber and about the provided vertical heat exchange tubes, a low velocity fluidizing or fluffing gas is charged to a lower cross-sectional portion of said downflowing particles and to an upper intermediate crosssectional portion of said cylindrical heat exchange chamber by a plurality of horizontally spaced apart elongated gas distributing means.

Some hydrocarbon feeds which may be processed by the combination operation of this invention are identified in Table 1.

TABLE I

| Oil or Crude | API Grav. 650+[2] Total | Volume 1 of 650+ Fraction Boiling at 650-1025 | Volume 1 of 650+ Fraction Boiling at 1025+ | Ramsbottom Carbon Content 650-1025 | Ramsbottom Carbon Content 1025+ | Wt. ppm Metals Ni | Wt. ppm Metals V | Wt. ppm Metals Fe | Ni Equiv. | Wt. % S in 650+ Total | Weight of Nitrogen (ppm) 650+Fraction Total | Weight of Nitrogen (ppm) 650+Fraction Basic | Wt. |
|---|---|---|---|---|---|---|---|---|---|---|---|---|---|
| VGO | 28.4 | 100 | 0.0 | 0.38 | 0.38 | 0.2 | 0.1 | | .059 | .83 | 722 | 260 | 0.8 |
| Mexican Isthmus | 16.9 (21.3) | 65.3 | 34.7 | 0.49 | 4.96 | 2.5+ | 33.8 | | 9.81 | 2.75 | 950 | 450 | 6.9 |
| Mexican Kurkuk[1] | 17.4 | | | | 9.30 | 35.0 | 99.0 | 17.0 | 58.02 | 2.94 | 2100 | 723 | 1.8 |
| Murban | 23.1 | 78.7 | 21.3 | 0.49 | 3.99 | 3.0+ | 1.5 | 11.9 | 4.99 | 1.65 | 512 | 200 | 7.5 |
| Arabian Light | 19.1 | 64.7 | 35.3 | 0.47 | 6.56 | 6.4 | 24.7 | 3.2 | 12.00 | 2.39 | 940 | 507 | 9.2 |
| Arabian Med. | 14.5 | 51.8 | 48.2 | 0.46 | 9.00 | 19.6 | 63.0 | 2.9 | 33.13 | 4.43 | | | |
| Ekofisk | 22.7 | 72.8 | 27.2 | 0.36 | 4.42 | 1.4 | 3.0 | 2.4 | 2.36 | 0.38 | | | |
| Fosterton | 10.9 | 43.6 | 56.4 | 0.42 | 16.81 | 48.8 | 119.0 | 3.1 | 74.03 | 4.22 | | | |
| Iranian Light | 17.4 | 60.8 | 39.2 | 0.48 | 9.01 | 21.9 | 60.0 | 3.1 | 34.84 | 2.50[4] | | | |
| La./Miss Sweet | 23.7 | 80.2 | 19.8 | 0.33 | 4.36 | 2.7+ | — | 8.5 | 3.90 | 0.26 | | | |
| Wyoming Sour | 12.4 | 40.7 | 59.3 | 0.32 | 15.1 | 0.6 | 70.0 | 2.0 | 15.47 | 3.84 | | | |

[1]A refinery blend of Mexican and Kurkuk crudes.
[2]Throughout table 650 and 1025 refer to 650° F. and 1025° F. respectively; 650+ refers to 650° F.+ material as defined below.
[3]Copper level was below 0.5%, except that Mexican Kurkuk contained 0.62; all metals expressed as metal in ppm, based on the weight of the 650+ fraction.
[4]Calculated.

BRIEF DESCRIPTION OF THE DRAWINGS

FIG. I is a diagrammatic block flow diagrammatic arrangement of the combination operation of the present invention comprising an MRS sorbent particle metals removal feed decarbonizing system in combination with a decarbonized-demetallized reduced crude fluid catalyst cracking system (RCC).

FIG. II is a diagrammatic sketch of process arrangement and apparatus employed for metals removal with fluid particles and provided with a solids cooler of selected design arrangement.

Figure 4:
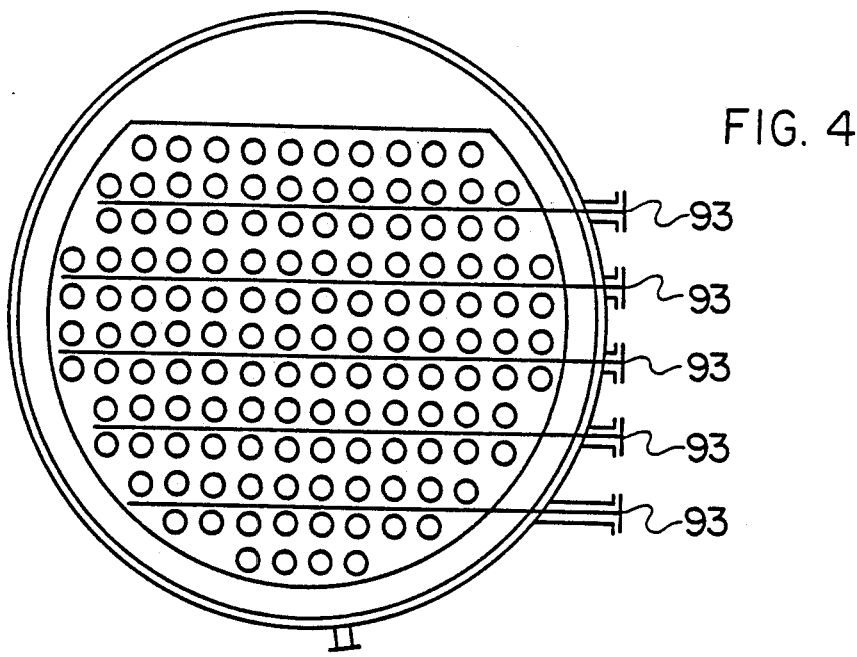
Figure 1:
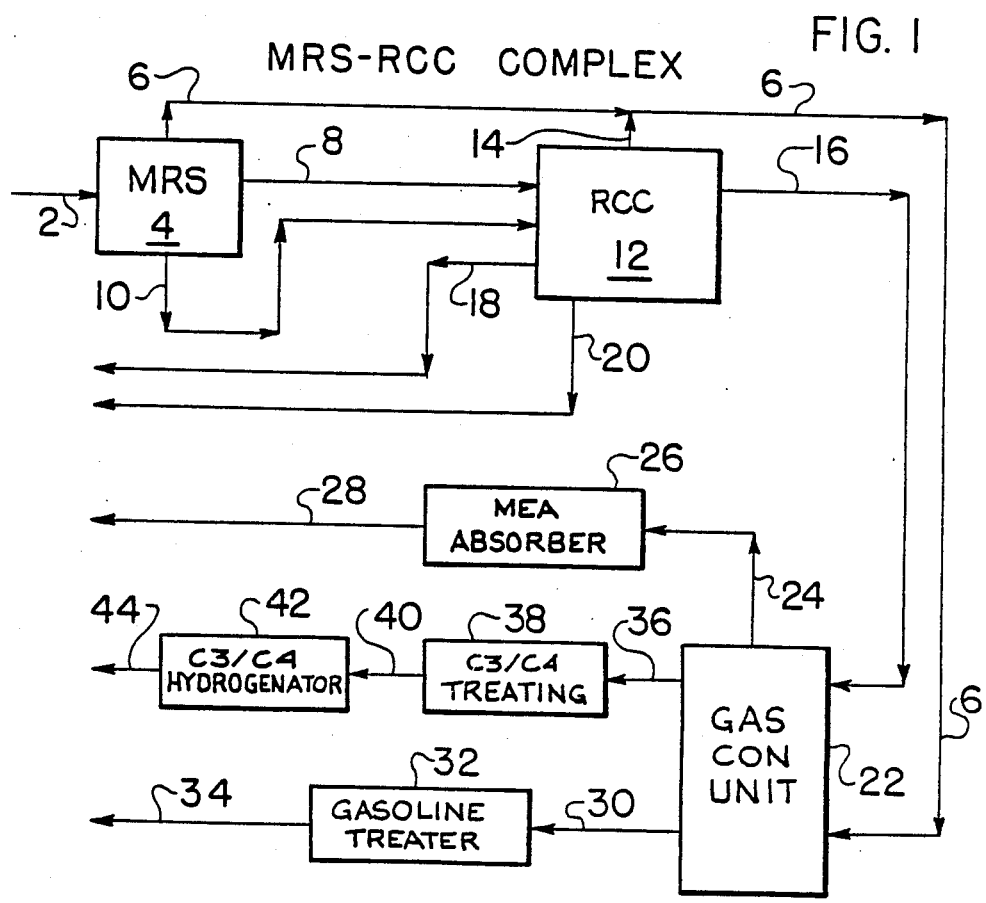
Figure 2:
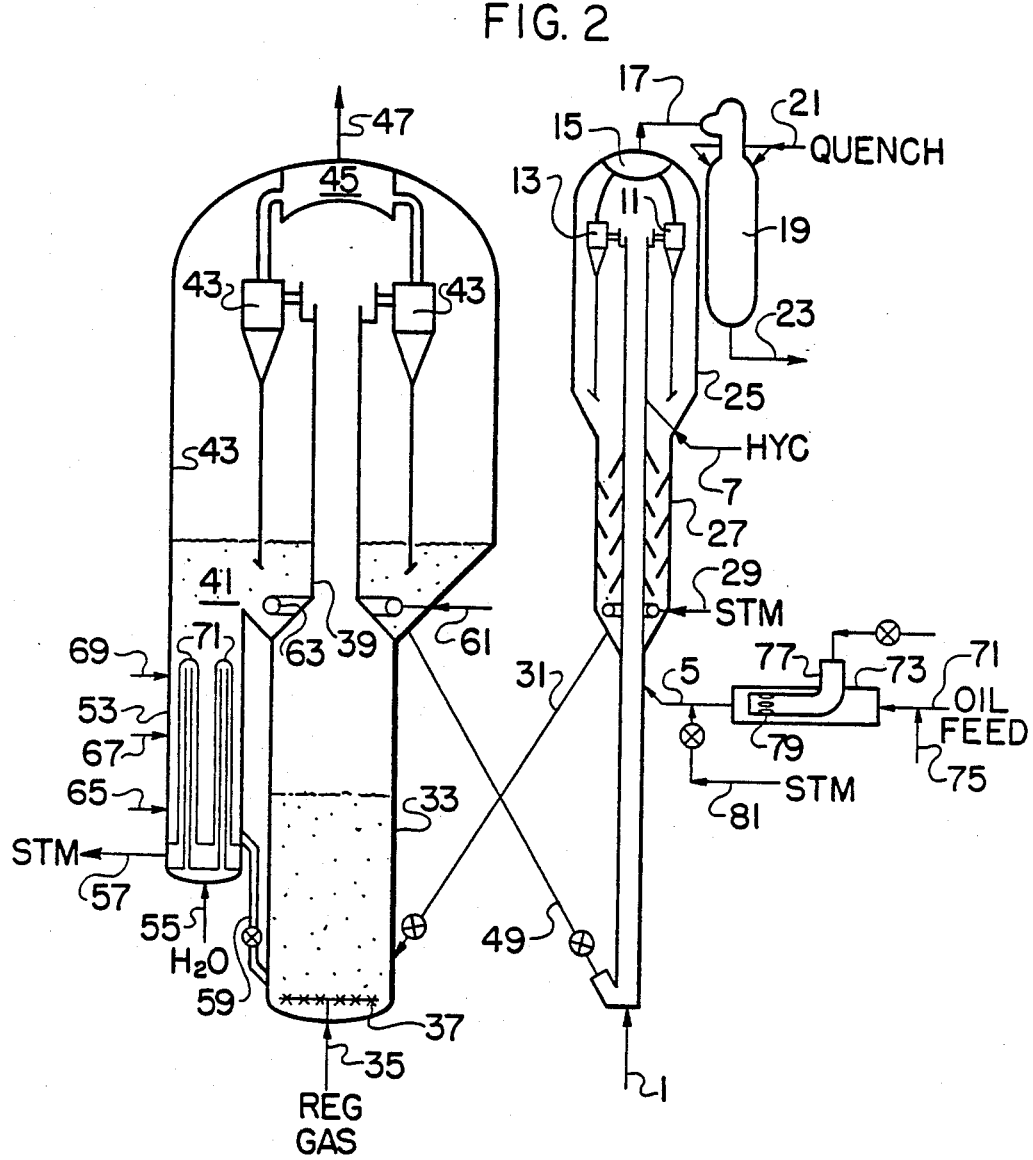
Figure 3:
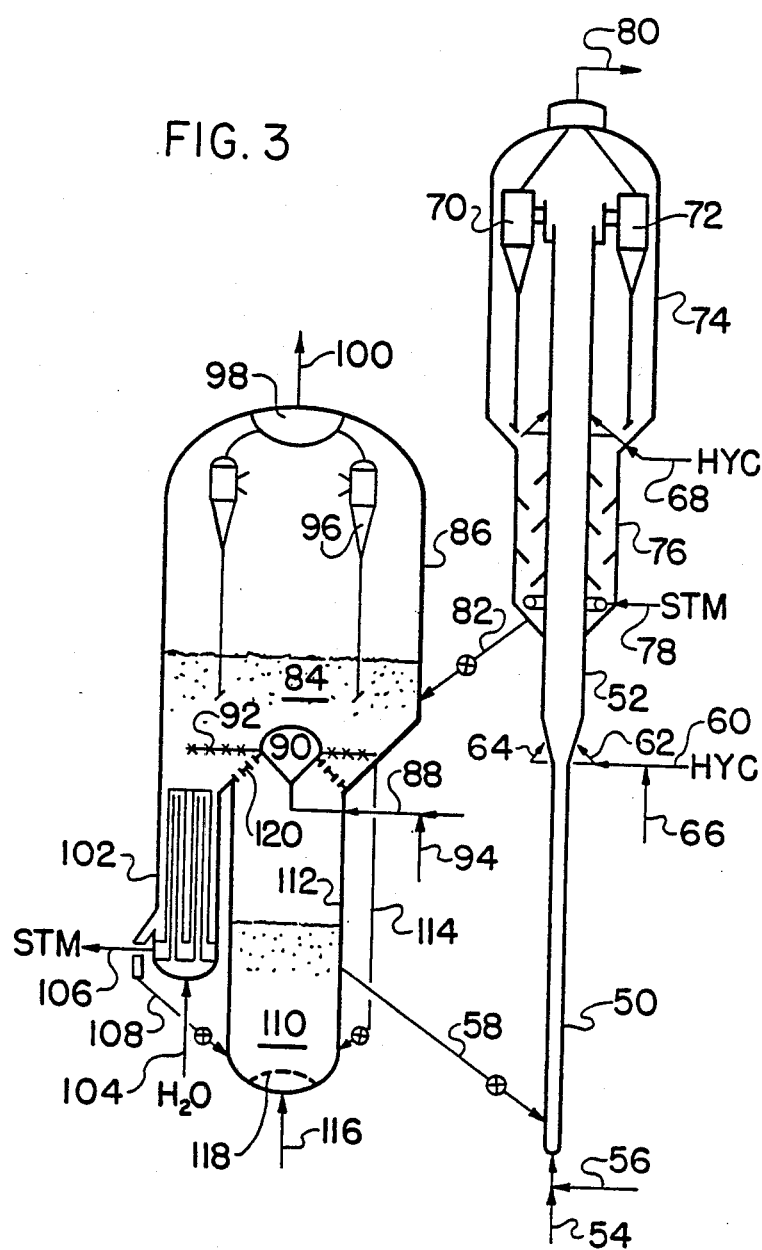
Figure 5:
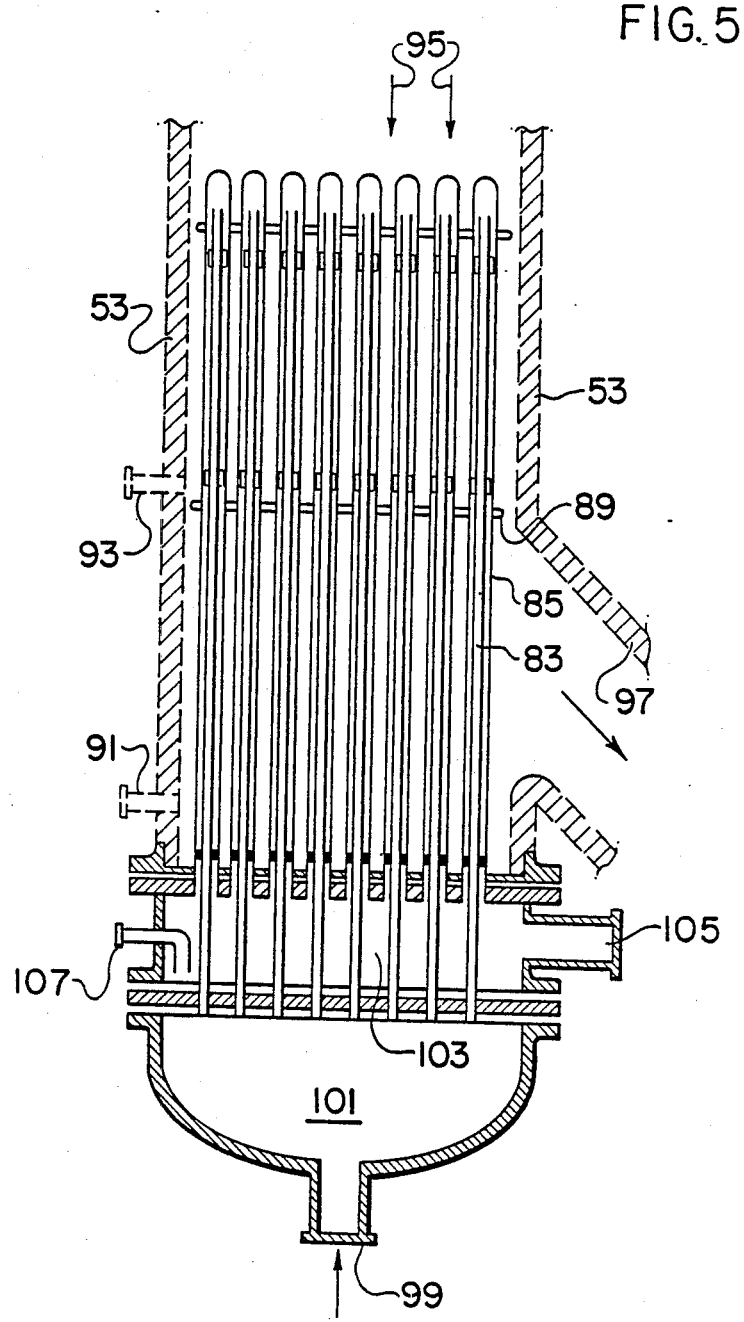

FIG. III is a diagrammatic sketch in elevation of the process and apparatus for the catalyst cracking and catalyst regeneration system comprising a special catalyst cooler design and a riser reactor section of larger diameter in an upper portion than in a lower portion thereof provided with a plurality of vertically spaced apart feed inlet means.

FIG. IV is a diagrammatic sketch in cross section of the solids cooler employed in FIGS. II and III showing the spaced apart heat exchange tube layout and means for charging fluidizing gas to the cross section.

FIG. V is a diagrammatic sketch in elevation of the cooler arrangement of FIGS. II and III comprising separate bottom header means for adding and withdrawing heat exchange fluid to the bayonet type heat exchange tubes.

In a more particular aspect, FIG. I is a block flow arrangement of an integrated combination of processing steps for upgrading gas oil and the higher boiling portions of crude oil known as resids, residual oils, and reduced crudes generally boiling above 552° C. (1025° F.) and comprising metal contaminants and relatively high Conradson carbon producing materials. More particularly the combination of processing steps generally represented by FIG. I comprise a metals-carbon removal contact step such as a decarbonizing and demetalizing operation with a solids sorbent material followed by a catalytic conversion operation designed and operated to convert the decarbonized feed to produce gasoline, lower boiling hydrocarbons as well as upgraded higher boiling liquid products thereof to form liquid and gaseous fuel products.

A fluid catalytic cracking catalyst such as one comprising a rare earth exchanged crystalline zeolite or an ammonia exchanged "Y" faujasite with and without rare earths such as an ultrastable "Y" faujasite zeolite provide with rare earths is used in the separate downstream catalytic cracking zone to convert the upgrading demetallized and decarbonized liquid products of visbreaking wth the sorbent material. The integrated combination operation of FIG. I utilizes fluidized solids coolers in combination with flue gas products combustion zones to generate process steam such as by combustion of CO rich regeneration flue gases and cooling of high temperature solid particles obtained in the regeneration operations. This generated process steam is utilized in a steam distribution and recovery system not shown which effectively contributes to the thermal efficiency of the combination operation. A common gaseous hydrocarbon product concentration and recovery section not specifically shown materially contributes to the operating efficiency of the combination operation.

FIG. II is a diagrammatic illustration of the apparatus identified as the (MRS) metals removal system wherein a heavy residual oil feed comprising components boiling above 1025° F. and including porphyrins, asphaltenes and metal contaminants is partially decarbonized and demetalized. The operation is a controlled thermal visbreaker operation relying on relatively high temperature fluidizable sorbent solids at a temperature below about 1500° F. for effecting initial contact with a heavy residual oil boiling above 650° F. or a reduced crude feed herein identified to effect a partial removal of metal contaminants in combination wth thermal degradation of particularly the high boiling carbon multi ring compounds and asphaltene type materials in the feed. The fluid sorbent solids thermal conversion system (MRS) is effected at an elevated temperature in a time limited riser contact zone providing a riser outlet temperature within the range of about 900° to 1050° F. or 1100° F. It is desirable to limit the hydrocarbon feed residence time and thus thermal conversion thereof in the riser below about 3 seconds and more usually below about 1 or 2 seconds. The visbreaking conditions are selected which will restrict any excess or undesired thermal cracking to naphtha boiling range material. However, it is preferred that the thermal visbreaking conditions be sufficiently severe to provide a vaporous product thereof, the major portion boiling below about a 2 Conradson carbon contributing product feed material. Thus, a product feed material is thermally produced which is more suitable for conversion with a crystalline zeolite type catalytic cracking catalyst of HY and/or a rare earth exchanged variety of crystalline zeolite in a downstream catalytic cracking system particularly shown in FIG. III. In the arrangement of FIG. II, provision is made for quenching or reducing the temperature of the thermally produced vaporous product separately recovered from the reactor vessel to a temperature inhibiting further thermal conversion thereof. The vaporous product is quenched preferable below the product thermal conversion temperature to restrict further conversion thereof. The quenched demetallized and decarbonized product of thermal visbreaking and boiling above about 350° F. and 400° F. is charged as feed to the riser reactor catalytic cracking operation of FIG. III.

The integrated combination operation of this invention discussed herein is a coalescence of novel operating concepts which synergistically contribute one to the other to provide a novel combination of steps for efficiently upgrading distress residual oil feed stocks to produce more desirable gaseous and liquid products.

The distress stocks which may be processed by the combination operation of this invention and disclosed in Table I include fractions of atmospheric and vacuum distillation such as topped crudes, residual oil, resids, reduced crudes and other heavy hydrocarbon materials obtained from coal, oil, shale, tar sands and a combination of such materials. Generally speaking, the oil feeds processed may comprise the whole barrel of the crude oil or residual portions thereof which boil above about 400° F. or more usually above 650° F. and which will comprise substantial amounts of high molecular weight hydrocarbon components identified herein and not vaporizable at temperatures above about 1000° or 1025° F. Thus depending on the feed source and the level of metals contamination, the initial boiling point of the heavy oil charge to the MRS visbreaking unit is a desalted crude oil of atmospheric distillation boiling above about 650° F. requiring demetallizing and decarbonizing thereof before contact with a selective zeolite cracking catalyst. The effects of metal contaminants and Conradson carbon found in the heavy ends of crude oils and other such source materials on cracking catalysts has been widely discussed in the literature. A recent article entitled "Burst of Advance Enhances Cat Cracking" by D. F. Tolen published in the Annual Refining Report of the *Oil and Gas Journal*, Mar 30, 1981, provides an up to date treatise on the subject.

The present invention is particularly concerned with the method and means for maintaining the regeneration temperature of the solid sorbent and catalyst particles employed within a particularly desired temperature range avoiding any substantial hydrothermal destruction thereof to perform their desired operation. This is accomplished as discussed below by the use of oxygen lean and oxygen rich combustion gases in combination with catalyst cooling between stages of particle material regeneration whether inert or catalytic.

The solid particulate materials suitable for use in the combination operation of the invention may be selected from a variety of materials providing the same or different product selectivities. It is preferred, for example, that inert sorbent solids be employed in the MRS demetallizing and decarbonizing step under conditions promoting particularly thermal conversion or visbreaking of component materials particularly boiling above about 538° C. or 552+° C. (1000° F. or 1025° F.) to hydrocarbon materials of a Conradson carbon equal to or less than 2 and boiling not substantially above about 566° C. (1050° F.) during substantial demetallizing to a metals level below 100 ppm Ni equivalents. Preferably the metals level is reduced to about 50 ppm of Ni+V. On the other hand, the catalyst solids employed in the RCC fluid cracking operation comprise a crystalline zeolite dispersed in a siliceous inorganic oxide matrix comprising one or more components of alumina, titanium, antimony, zirconium and combinations thereof with or without rare earths admixed therewith. Preferably the catalyst composition comprise a catalytically active crystalline faujasite zeolite of less than 40 wt.% such as not more than about 20 or 25 wt.% in combination with a stabilizing amount of rare earths and dispersed in a siliceous matrix comprising an abundance of alumina. The zeolite may be an ammonia exchanged zeolite, a rare earth exchanged zeolite or a combination thereof. On the other hand, the zeolite may be considered and prepared as a lanthanum rich crystalline zeolite-siliceous matrix providing cracking activity with or without the presence of an ammonia exchanged ultrastable faujasite zeolite.

DISCUSSION OF PREFERRED EMBODIMENTS

Referring now to FIG. I by way of example, there is shown a simplified diagrammatic block flow arrangement of the combination process of this invention. In the arrangement of FIG. I a hydrocarbon feed such as a crude oil, a reduced crude portion, a residual oil feed portion boiling above about 343° C. (650° F.) and comprising Conradson carbon contributing high boiling residual crude components up to 10 or 20 vol.% including porphyrins, asphaltenes and polycyclic compounds are charged by conduit 2 to a (MRS) metals removal thermal visbreaking contacting system 4 wherein the heavy residual oil feed is contacted with solid sorbent particulate material having little if any cracking activity under conditions to thermally visbreak the higher boiling components in the feed boiling above about 552° C. or 566° C. (1025° F. or 1050° F.) to compounds boiling below 1050° F. Metal contaminants particularly nickel and vanadium either with or without the presence of passivating metal components are deposited on the sorbent material thereby producing a residual oil product of lower metals level in conjunction with reducing the feed Conradson carbon value. During this thermal contacting operation with solid sorbent particulate material, a wet gas product of the thermal visbreaking operation is formed and recovered by conduit 6. A $C_5+$ naphtha product is recovered by conduit 8 and a 204° C. or 221° C. (400° F. or 430° F.) plus product material is recovered by conduit 10. The $C_5$ plus naphtha product material in conduit 8 may be upgraded by catalytic reforming or by fluid catalytic cracking such as in the RCC operation discussed below or in a more conventional fluid catalytic cracking (FCC) process. The 204° C. or 221° C. (400° F. or 430° F.) plus product material in conduit 10 a 343° C. (650° F.) plus product or a higher boiling portion thereof is charged to the RCC (reduced crude cracking) operation such as unit 12 more fully discussed below with respect to FIG. III. The separated product of visbreaking boiling between 204° C. and 343° C. (400° F. and 650° F.) may be charged to separate FCC operation instead of to the RCC operation. During catalytic cracking conversion of the demetallized feed material obtained from the MRS thermal conversion operation, a wet gas product stream is formed and recovered by conduit 14, a main column overhead liquid product is recovered by conduit 16, and a 221° C. to 332° C. (430° F. to 630° F.) product fraction is recovered by conduit 18. A 332° C. (630° F.) plus fraction of uncovered material stream may be recovered by conduit 20. The RCC conversion products recovered by conduits 18 and 20 may be used alone or together as fuel oil in blending operations not shown. On the other hand the 331° C. (630° F.) plus product in conduit 20 may be further converted by catalytic cracking either in a separate FCC unit not shown or as recycle to the RCC unit 12. The 221° C.-332° C. (430° F.-630° F.) product in conduit 18 may also be further refined as desired to meet fuel demands as by cracking, hydrogenation and other processing steps suitable for the purpose. The RCC main column overhead liquid product recovered in conduit 16 and boiling below about 430° F. is passed to a gas concentration unit 22 discussed below. So also is the wet gas recovered product in conduits 6 and 14 blended and passed by conduit 6 to unit 22. The operation of the gas concentration unit provides a dry fuel gas stream withdrawn by conduit 24 comprising hydrogen which material is then passed to an MEA absorber 26 for removal of sulfur compounds before being recovered by conduit 28. A gasoline product boiling in the range of $C_5$ hydrocarbons up to about 204° C. or 221° C. (400° F. or 430° F.) is recovered from unit 22 by conduit 30 and passed to a gasoline treating unit 32 before being recovered by conduit 34. In gasoline treating unit 32 it is contemplated treating the gasoline with a caustic wash and an electrostatic precipitator to remove undesired impurities in a manner known in the industry. The fuel gas stream recovered by conduit 24 and comprising $C_2$ minus gaseous material including hydrogen may be recycled without MEA treatment to a riser contact zone of the combination operation as lift gas to form a suspension with fluidizable solids particles and/or used as an oil atomizing diluent.

A $C_3$-$C_4$ product fraction recovered from unit 22 by conduit 36 is passed to a $C_3$-$C_4$ treating unit 38. In unit 38, the $C_3$-$C_4$ fraction is treated to remove sulfur impurities and then caustic washed.

The product of treating unit 38 is passed by conduit 40 to a hydrogenation unit 42 to particularly accomplished hydrogenation of diolefins before the $C_3$-$C_4$ product is recovered by conduit 44.

Referring now to FIG. II by way of example, there is shown a specific arrangement of apparatus for effecting the thermal visbreaking of a charged residual oil or reduced crude containing feed with a solid sorbent material to accomplish metals removal and reduce the Conradson carbon producing components of the feed as recited above. The fluid solids contact system of FIG. II is referred to herein as the MRS (metals removal system) wherein some decarbonizing thermal visbreaking occurs in a riser contact zone 3 maintained under selected operating conditions. Thermal conversion of the heavier residual oil portion of the charged feed comprising metal contaminants and coke contributors with fluid sorbent particulate material is particularly promoted. The sorbent may be a kaolin type solid sorbent particulate material, substantially spent catalyst particles or other suitable sorbent material of little or no catalytic cracking activity and suitable for the purpose. Thermal conversion of the heavy portion of the residual oil feed is accomplished at an elevated temperature with a dispersed solids phase suspension in a riser zone under limited contact time and velocity conditions providing a riser outlet temperature within the range of about 482° to 566° C. or 593° C. (900° to 1050° F. or 1100° F.). Space velocity conditions and the hydrocarbon feed partial pressure in the presence of a diluent preferably comprising hydrogen such as provided by recycled wet gas or dry gas products are selected to accomplish substantial metals removal preferably in the absence of substantial thermal cracking to naphtha boiling range products. In the specific arrangement of FIG. II, a fluidizing gas or gasiform material such as a wet or dry product recycle gas comprising hydrogen is added by conduit 1 to the bottom of a riser reactor zone 3 to fluidize the sorbent material charged thereto by conduit 49 and form a suspension therewith which is passed upwardly through riser 3 at a reasonable velocity above 50 ft./sec. but less than 100 ft./sec. The hot solid particulate material obtained from the regeneration operation defined below and at a temperature in the range of 704° to 815° C. (1300° to 1500° F.) and preferably below 760° C. (1400° F.) is charged to the bottom portion of the riser in an amount selected to form a dispersed phase solids suspension with charged lift gas. This combination of lift gas with charged fluidized sorbent solids is selected to provide a solids concentration in the range of 10 to 35 pounds per cu. ft. in a bottom portion of the riser before contact with atomized heavy hydrocarbon feed material in the riser under selected temperature and pressure thermal visbreaking conditions. The formed upwardly flowing suspension of solid sorbent particulate is contacted with the heavy oil feed at a temperature in the range of about 149° to 316° C. (300° to 600° F.) and of low partial pressure contributed by admixture with a suitable amount of atomizing diluent material such as naphtha, steam, gaseous hydrocarbons, and hydrogen containing recycle dry or wet recycle gases with or without added water such as a sour water product. A suspension reduced in solid particle concentration in a vaporous product is recovered from the top of riser 5 following a hydrocarbon residence time in the riser less than about 3 seconds and preferably within the range of 0.5 to 2 seconds. In order to vary as desired the solids contact time with charged hydrocarbons, the riser 3 is provided with a plurality of vertically spaced apart heavy oil feed inlet means, 5 and 7, the first of which is just below the bottom of stripper 23 as feed inlet 5. Feed inlet means 7 is provided in a more downstream end of the riser 3. A feed inlet 9 may be provided in riser 3 below inlet 5. The suspension formed and passed through riser 3 is discharged from the top or open upper end of the riser and is rapidly separated by momentum differential know as ballistic separation. Cyclone separation is also provided so that vaporous hydrocarbons of thermal visbreaking and gasiform diluent material are thereafter rapidly separated and recovered from any entrained sorbent solids fines by passing through a plurality of parallel arranged cyclone separators 11 positioned about the upper open end of the riser contact zone which are in open communication with an annular vapor collection zone about the riser open end. Hydrocarbon vapors separated from entrained solids by the combination of ballistic and cyclone separator means are collected in a plenum chamber 15 before withdrawal or recovery by conduit 17 as a vaporous material at an elevated temperature of at least about 510° C. up to about 593° C. (950° F. up to about 1100° F.). The vaporous material in conduit 17 is preferably rapidly quenched as quickly as is possible in a quench zone or chamber 19 by a plurality of cold liquid quench streams charged by conduit 21 to provide a product temperature below about 800° F. but not below the inlet temperature of a downstream fractionation zone. The quench product comprising a mixture of vaporous and liquid product of the MRS thermal visbreaking and mixed with a portion of a main column bottoms product as quench fluid in chamber 19 is passed by conduit 23 to a main column product recovery section not shown. Solid particulate sorbent material such as a kaolin type sorbent material or other suitable solid sorbent particle material comprising accumulated metal deposits and carbonaceous material of thermal visbreaking is collected in a bottom portion of vessel 25 for passage downwardly through a stripping section or zone 27 to which stripping gas such as steam is charged by conduit 29 at a temperature of at least about 204° C. up to about 538° C. (400° F. up to about 1000° F.). Higher stripper temperatures up to 566° C. (1050° F.) are also contemplated. Stripping solid sorbent particulate material is passed by standpipe 31 provided with a flow control valve to a relatively dense fluid bed of solid particulate material in a bottom portion of regeneration zone 33. Regeneration gas or combustion supporting gas such as an oxygen modified gas or air is charged to a bottom portion of the fluid bed of solids in the regeneration zone by conduit 35 communicating with a gas distribution means 37 and comprising a plurality of radiating gas distributor means or pipes across the regenerator cross-section. Regeneration of the sorbent particulate material by combustion of deposited carbonaceous material is accomplished at an elevated temperature of about 704° C. up to about 760° C. or 815° C. (about 1300° F. up to about 1400° F. or 1500° F.) preferably with an oxygen containing gas promoting the formation of a (CO) carbon monoxide and/or carbon dioxide rich regeneration flue gas as desired. Combustion product gases carry suspended sorbent particles overhead from an upper level of the more dense fluid mass of solid particulate in the bottom of the regeneration zone 33 and of a concentration greater than about 20 or 25 pounds/cu. ft. upwardly through a restricted or confined elongated passageway 39 open in its upper end. The solids pass through the elongated transport zone as a suspended mass of solid particulate material in hot combustion product flue gases at a lower solids concentration less than 25 pounds per cu. ft. but above about 5 pounds per cu. ft. for discharge into an upper enlarged solids disengaging zone under momentum disenaging condition known as ballistic separation. A separation is made between solid particulate and product flue gases by the combination of ballistic separation, hindered settling under reduced velocity conditions and by cyclone separators means provided in the upper enlarged portion of the regeneration zone. The separated hot solid particulate material is collected as an annular fluid bed of material 41 recovered at an elevated regeneration temperature in an annular zone about restricted elongated passageway 39 in a lower bottom portion of said enlarged disengaging zone 43. Flue gases separated from solids initially by ballistic separation pass in parallel flow through a plurality of a cyclones 43 in open communication with an annular zone positioned about the open upper end of passageway 39 for removal of entrained sorbent fines from flue gases passed there through. The combustion product flue gases then pass to a plenum chamber 45 for withdrawal therefrom by conduit 47 and further treatment by means not shown.

Regenerated solid sorbent particulate material collected as a fluid bed 41 at an elevated temperature within the range of 538° C. to 815° C. (1000° F. to 1500° F.) is passed by in part by standpipe 49 to a lower bottom portion of riser 3 for upflow therein as herein proposed. A portion of the hot regenerated sorbent is passed downwardly and directly into the top of cylindrical heat exchanger zone 53 more fully discussed below wherein desired partial cooling of the sorbent material is accomplished. A high temperature water-steam mixture is particularly generated in heat exchanger 53 by indirect heat exchange with charged boiler feed water introduced by conduit 55 to a bottom plenum chanber. A steam-water mixture temperature of about 232° C. (about 450° F.) or more is recovered by conduit 57. The solid sorbent particulate reduced in temperature from about 50 degrees up to about 200 degrees and more usually about 100 degrees or as required for regeneration temperature control is withdrawn by conduit 59 for passage to a relatively dense but generally upflowing fluid mass of particulate sorbent solids 33 in regeneration zone 33. The solids flow upwardly during regeneration into the dispersed solids phase in the restricted diameter transport section 39 thereabove to the upper open end thereof. Ballistic separation of solids from regeneration flue gas is accomplished as herein discussed at the upper discharge end of the solids transport zone.

In cooler 53, fluidizing gas is charged by two or three vertically spaced apart distributor emans such as by inlet means 65, 67 and 69. In heat exchanger 53, there are a plurality of vertically arranged heat exchange tubes 71 comprising an elongated upwardly extended inner tube encased by a larger diameter tube means open in the bottom end thereof only and communicating with a hot water-steam collecting plenum or header chamber. Thus boiler feed water passes from a lower header chamber upwardly through the central open ended elongated tubes as shown and then downwardly through the outer annular zone formed therewith by the larger diameter heat exchange tube to a water-steam collecting header chamber from which it is withdrawn by conduit 57. The downwardly flowing hot solids are in direct heat exchange contact with the outer surfaces of the outer heat exchange tubes comprising a downwardly flow liqud water-steam mixture.

In yet another aspect, the heavy residual oil feed charged to the riser by conduit 5 is preferably in an atomized condition formed with one or more diluent materials as herein discussed. That is, the heavy residual oil feed is charged for example by conduit 71 to a mixing chamber 73 with or without a gaseous diluent material. Water may be mixed with the heavy oil feed as desired or a viscosity reducing hydrocarbon material alone may be added to the feed by conduit 75. Mixing chamber 73 is provided with conduit means 77 referred to as a quill with holes in the downstream wall thereof adjacent the terminal capped end thereof. The quill means may be used for charging water such as product sour water, oil, a mixture of oil and water or an atomizing diluent material to chamber 73. The charged oil-diluent mixture assists with atomized dispersion thereof with a fluid charged by quill 77 and thereafter passed in contact with suspended solid particle sorbent material in riser 3. It is also contemplated charging the heavy oil feed by the quill means 77 comprising holes 79 for admixture with an atomizing gasiform dispersant material of considerable velocity charged by conduit 71 and through the annular zone about the quill means which will shear the oil feed streams charged through the plurality of small openings 79 in the wall of the quill adjacent the capped terminal end thereof to form a highly atomized mixture thereof which is then passed through conduit 5 to the riser. Purge steam at a pressure of about 150 psig may be added by conduit 81 to conduit 5. Such an atomizing oil feed means or other suitable feed atomizing means may also be employed with feed inlet means 7 and 9.

It will be recognized by those skilled in the art that the arrangement of apparatus of FIG. II provides for effecting thermal visbreaking of heavy residual oil feeds with fluid solid sorbent particle material. The operation may be effected in the presence of recycled gaseous product material such as a wet or dry gaseous product of reaction comprising considerable or little hydrogen and hydrogen contributing doner materials. Thus the operation is regarded as a selective hydrothermal visbreaking operation which is maintained under temperature hydrocarbon partial pressure and vapor contact time condition particularly promoting the thermal cracking of compounds boiling above about 552° C. (about 1025° F.) to form compounds of lower mono,di and tri ring structures boiling below 552° C. (1025° F.) and reduced substantially in contaminating metal components of nickel and vanadium.

The substantial amount of hydrocarbonaceous deposits of thermal visbreaking often referred to simply as coke is then removed from the solid sorbent particle material in a temperature controlled combustion regeneration environment limited not to exceed 815° C. (1500° F.) and preferably the temperature is maintained less than 815° C. (1500° F.) say about 1400° F. by mixing a substantial amount of cooled recycled regenerated solids obtained as above discussed with the solids to be regenerated in zone 33. The regenerated solids are cooled in the heat exchanger by an amount of at least 100 or more degrees by the indirect heat exchange with boiler feed water. Steam at an elevated pressure separated from a steam-water mixture obtained from the sorbent heat exchanger is recovered and used for such things as stripping solids recovered from thermal conversion, for forming an atomized heavy oil feed charged to the operation and/or for generation of power through a prime mover system not shown. The heat exchanger may be used to generate low or high pressure steam.

Referring now to FIG. 111 there is shown an arrangement of apparatus or vessels with interconnecting conduits for effecting transfer of catalyst solids between vessels comprising an (RCC) reduced crude cracking reactor-regenerator system and relied upon to process a demetallized and decorbonized product feed material recovered from the MRS thermal decarbonizing and demetallizing system comprising the reactor-regenerator arrangement of FIG. II. As mentioned above, the redidual metals in the RCC feed on the basis of (Ni+V) nickel plus vanadium charged to the RCC riser reactor will be considerably reduced by the MRS solid sorbent contacting and visbreaking system and usually will be less than about 100 ppm depending on feed charged and with some residual oil feeds will be 50 ppm Ni+V or less.

The operation of the (RCC) reduced crude fluid catalyst cracking system of FIG. III comprising two sequential stages of catalyst regeneration one above the other in combination with a riser cracking operation is different from a more conventional gas oil (FCC) fluid catalyst cracking system processing gas oil feeds boiling below 552° C. (1025° F.) because of the reduced contaminating metals content and the absence of Conradson carbon contributing materials. Therefore the RCC operation requires a more critical and selective control with respect to the catalyst conversion conditions used activity maintained, temperature of combustion of the hydrocarbonaceous material deposited on the catalyst particles and a catalyst replacement rate to limit the metal deposit level on the catalyst within desired limits. Operation of the (RCC) residual oil or reduced crude cracking system is critically functional with respect to maintaining the heat balance of the system, the level of metals accumulation, and the feed conversion selectivity to desired products. Catalytic cracking of the thermally visbroken heavy oil feed as herein provided is desirable to improve gasoline and light cycle oil product selectively and yield.

The combination operation of this invention is easily undesirably altered when a selective balance of the operating parameters are permitted to vary from a relatively strict range of operating conditions into a less selective and less efficient uneconomical operation. Thus it is desirable to restrict the thermal visbreaking operation as herein provided in conjunction with maintaining a highly selective catalytic cracking operation so that one can substantially restrain the amount of heat generated in any one stage not to substantially exceed that required and transferred to the RCC riser cracking zone by the catalyst. If is found desirable in yet another aspect to maintain some low residual coke below about 0.25 wt.% on the regenerated catalyst since it is found helpful to suppress to some considerable extent undesirable characteristics of accumulated metals on the catalyst. The catalytic cracking operating conditions of time, temperature, feed composition and catalyst composition utilized permits one to more selectively convert the thermally visbroken product under conditions providing a high degree of selectivity in yields of desired liquid fuel products comprising gasoline and liquid fuel oils as well as utilizable gasiform materials. Some additional gasoline boiling range product materials may be produced from the product gasiform materials of the MRS and RCC operations such as by alkylation, isomerization, polymerization or a combination thereof.

The RCC crystalline zeolite catalyst cracking process and apparatus of this invention relies in substantial measure upon maintaining the temperature of the conversion product vapors at the riser outlet restricted to within the range of about 510° C. to about 593° C. (950° F. to about 1100° F.) and more particularly restricted not to exceed about 566° C. (about 1050° F.) when charging as feed the demetallized and decarbonized product of the thermal visbreaking operation herein described. The demetallized and decarbonized product of the MRS hydrovisbreaking operation charged to the RCC feed inlet means is normally an atomized liquid phase which may be at a temperature up to about 316° C. (600° F.). The use of homogenizing water with the oil feed and/or a diluent atomizing and dispersant material is employed to form the atomized oil feed dispersed with suspended upflowing catalyst particles as herein identified. A relatively high velocity upflowing suspension of catalyst particles, gasiform diluent material and hydrocarbon product vapors is formed rapidly in a portion the riser cracking zone immediately downstream of the selected oil feed inlet and of a velocity sufficient to restrain the conversion reaction time frame of hydrocarbons in contact with catalyst particles in the riser less than about 2 but above about 0.5 second. Thus it is important to achieve rapid atomized feed dispersed phase contact of the heavy oil feed with the high temperature catalyst particles charged to the riser at a temperature within the range of 732° C. to 760° C. (1350° F. to 1400° F.). This in combination with achieving rapid downstream separation of formed hydrocarbon product vapors from catalyst substantially immediately upon completing a selected contact time interval within the riser contributes to improved product selectivity.

In order to more particularly accomplish the above identified selective catalytic conversion operation, the riser reactor is operated to provide a rising suspension of hot catalyst particles with fluidizing gaseous material such as recycled product dry gas, steam or a mixture thereof. The relatively high velocity upwardly flowing suspension is mixed with the partially decarbonized and demetallized high boiling atomized oil feed material in a selected downstream portion of the riser reactor for flow through preferably a larger diameter portion thereof. However, some oil feeds may be charged to a bottom portion of and adjacent the catalyst inlet thereto. The velocity of the hydrocarbon vapor-catalyst suspension passed upwardly through to the discharge end thereof is sufficient to provide a discharge velocity in the range of 60 to 100 ft./sec. and preferably not above about 85 or 86 feet per second. A reduction in the hydrocarbon vapors - catalyst suspension discharge velocity at the riser outlet may be accomplished by increasing the diameter of the riser reactor. In another embodiment the oil feed inlet may be in an expanding transition section of the riser from a smaller diameter lower riser portion as shown in the drawing. A further substantial reduction in vapor-catalyst suspension velocity is achieved upon discharge from the riser upper open end into a larger diameter product vapor-catalyst particle disengaging vessel zone about the upper discharge end of the riser. The discharge of the hydrocarbon vapor-catalyst suspension from the riser is preferably under conditions establishing momentum differential between catalyst solids and vapors when the temperature of the suspension is maintained below about 552° C. (about 1025° F.) but above about 524° C. (975° F.) in a specific embodiment.

The riser contact zone of FIG. III is of smaller diameter in a lower section 50 thereof than in an upper section 52. A lift gas is charged to the bottom of the riser by conduit 54 with or without thermally produced naphtha added by 56 for admixture with the regenerated hot catalyst particles charged thereto by conduit 58 to form an upflowing suspension thereof at an elevated temperature in the range of 1250° F. to 1400° F. The thus formed suspension of lift gas and regenerated hot catalyst particles pass upwardly through the bottom section 50 of the riser at a relatively high velocity up to about 100 ft./sec. to an expanding transition section 10 and into the upper larger diameter portion of the riser reactor. The charged oil feed product of thermal visbreaking upgrading obtained as above discussed is charged in one specific arrangement by conduit 60 to suitable atomizing feed nozzles 62 and 64 provided and penetrating the wall of the expanding transition section of the riser reactor. The atomized oil feed and diluent material charged by conduit 66 is sprayed into the upflowing suspension of catalyst particles and lift gas to provide a desired elevated catalytic conversion temperature. A suitable dispersant diluent material may be added by conduit 66 to the oil feed in conduit 60 as required to provide a more easily atomized oil feed thereafter charged to the riser transition section. The contact time of the introduced atomized oil feed to obtain desired conversion product vapors in a downstream section 52 of the riser contact zone is restricted to a relatively short reaction time frame preferably not more than 2 seconds. To achieve a hydrocarbon feed contact time within section 52 of the riser up to or less than one second, it is contemplated charging the atomized oil feed to a more down stream portion of the riser section 52 such as above the inlet to the catalyst stripping zone 76 by feed inlet means 68 also comprising a plurality of horizontally spaced apart feed inlet means about and penetrating the riser wall section. The suspension discharged from the riser section may be separated by any one of the techniques known and described in the prior art. A technique known as ballistic separation and provided by establishing a momentum differential between vapors and catalyst particles is provided by the apparatus arrangement of FIG. III. The ballistic separation technique relies upon using a discharge velocity which establishes a substantial momentum differential between the solid catalyst particles and the vaporous products of hydrocarbon conversion to achieve an initial separation thereof. Vaporous product material separated from particles of catalyst discharged from the riser are collected in an annular zone about the riser outlet which is in open confined communication with cyclones 70 and 72 housed within the enlarged vessel means 74 about the riser open end. Vessel means 74 is in open communication in a bottom portion with a lower smaller diameter cylindrical chamber 76 forming an annular stripping zone about riser section 52. Stripping gas is charged to a bottom portion of the stripping zone by conduit 78 for upward flow therethrough and countercurrent to downwardly flowing catalyst. Separated product vapors and stripping gas following passage through cyclone separation means are recovered from the top portion of vessel 74 by conduit 80 for passage to a product fractionation zone not shown. The discharged catalyst particles separated from hydrocarbon vapors also by hindered settling in the enlarged velocity reducing disengaging zone 74 and by cyclones 70 and 72 pass downwardly through the annular stripping zone maintained at an elevated catalyst separation temperature or higher before being recovered from the bottom thereof and passed by conduit 82 to a first fluid bed of catalyst particles 84 being regenerated in a first stage of catalyst regeneration in vessel 86.

In one specific embodiment, the catalyst charged to bed 84 and comprising hydrocarbonaceous deposits of catalyst conversion and metal deposits is partially regenerated in an oxygen lean atmosphere providing a CO rich flue gas product comprising $CO_2$ and sulfur oxides under regeneration temperature conditions constrained not to exceed about 1400° F. and preferably not exceed 1350° F. Some liquid water or steam may be added directly to the fluid catalyst bed 84 either separately or with the oxygen lean regeneration gas to assist with limiting regeneration temperatures encountered therein during removal of a portion of the hydrocarbonaceous deposits of catalytic conversion deposited on the catalyst and obtained as herein defined. In the arrangement of the drawing a suitable oxygen containing regeneration gas stream is introduced by conduit 88 to a plenum distributor chamber 90 communicating with gas distributing means such as a plurality of radiating regeneration gas distribution means 92 for charging regeneration gas to a lower bottom cross section portion of bed 84. In regeneration vessel zone 86, partial regeneration of the catalyst is initially accomplished under temperature limited conditions to remove substantial hydrocarbonaceous deposits up to about 75% or more thereof on the catalyst particles. The use of an oxygen lean regeneration gas restricting the combustion temperature encountered is essential in this first stage of regeneration in view of the substantial hydrogen content of the carbonaceous deposits. CO rich flue gas comprising steam, sulfur oxides, nitrogen oxides and $CO_2$ pass through cyclone separators 96 for removal of entrained catalyst fines before the flue gases pass to a plenum chamber 98 for withdrawal by conduit 100. Cyclone separated fines are returned to catalyst bed 84 by diplegs provided.

The partially regenerated catalyst in bed 84 is preferably withdrawn downwardly and directly into the upper open end of cylindrical cooler means 102 to which boiler feed water is charged by conduit 104 to a lower header distributor chamber and a hot steam-water mixture is recovered by conduit 106 from an adjacent lower header chamber. The indirect cooling of the partially regenerated catalyst passed downwardly through the heat exchanger is accomplished by an amount in the range of 100 to 200 degrees. The thus obtained lower temperature partially regenerated catalyst particles are recovered from a lower portion of cooler 102 for passage by conduit 108 to a relatively dense fluid bed of catalyst 110 being regenerated in a second stage of catalyst regeneration in vessel 112. The partially cooled catalyst particles may be passed to an upper or lower portion of bed 110. Provision is also made for passing some catalyst particles as desired directly from bed 84 to bed 110 without intermediate cooling by conduit 114. It is preferred however for temperature control purposes that substantially all of the transferred catalysts pass through cooler 102 and in an amount sufficient to sustain a restricted regeneration temperature not to exceed about 1500° F. An oxygen rich combustion supporting regeneration gas is charged by conduit 116 to a bottom portion of vessel 112 for flow through a regeneration gas distributor means provided with a distribution grid means 118. The catalyst in bed 110 is regenerated by combusting residual carbonaceous material remaining on the catalyst following the first stage of regeneration under temperature conditions restricted to within the range of 732° C. to 815° C. (1350° F. to 1500° F.). The removal of residual carbonaceous material or carbon from the partially regenerated catalyst particles following the first stage of regeneration is accomplished in the second stage of regeneration to achieve a lower value preferably less than 0.25 wt.%. The regeneration temperature of the catalyst in bed 110 is preferably restricted not to substantially exceed about 760° C. (about 1400° F.) during combustion in the presence of an oxygen rich combustion gas producing $CO_2$ rich flue gases comprising some unconsumed oxygen. Thus the temperature of the catalyst regenerated in bed 110 is dependent in substantial measure by the extent of carbonaceous material removal and temperature of the catalyst in bed 84 of the first stage of regeneration in cooperation with the heat removal by indirect cooling of cascaded catalyst by catalyst cooler 102. The hot flue gases of this second stage of catalyst regeneration at a temperature preferably not substantially above about 760° C. (about 1400° F.) and comprising $CO_2$ rich flue gas with some unconsumed oxygen is passed through a gas flow baffle means 120 separating the lower regeneration zone from the upper regeneration zone. Flue gas flow through gas flow passageways in an annular conical baffle member arranged to severly limit if any back flow of catalyst particles therethrough from bed 84 to the lower bed 110 in the event there is loss of flue gas flow upwardly therethrough from the lower regeneration zone. The $CO_2$ rich flue gas comprising oxygen pass from the upper dispersed catalyst phase in zone 112 and through the passageways in baffle 120 into a bottom portion of catalyst bed 84 in the first regeneration zone. This introduction of hot $CO_2$ rich flue gas into bed 84 is shown beneath regeneration gas distributor arms 92 for flow upwardly through the remaining portion of the catalyst bed 84 for recovery with CO rich regeneration product flue gases of said first stage of regeneration may be discharged by confined passageways extending into an upper portion of bed 84 as another means for preventing any substantial catalyst particle back flow therethrough. The particles of catalyst regenerated in the sequence of regeneration zones herein described provide catalyst particles at an elevated temperature above identified and comprising less than about 0.25 wt. % of residual coke thereon which catalyst is thereafter withdrawn from an upper or lower portion of catalyst 110 and passed by conduit means 58 to a lower portion of the riser section 50 as shown in FIG. III.

In the regeneration system of FIG. III the dense fluid bed of catalyst 84 is shown moving generally downward and counter current to rising oxygen lean combustion supporting gas. In the second stage of regeneration, the fluid bed 110 is shown flowing generally upward concurrent with rising oxygen rich regeneration gas. However, the catalyst flow may be generally reversed in each catalyst bed in the regeneration zones so that the catalyst bed 110 moves generally downward and counter current to rising regeneration gas by passing the cooled catalyst from a bottom portion of the cooler 102 above the steam header directly into an upper portion of bed 110 in the lower regeneration zone and withdrawing the regenerated catalyst from a bottom portion of bed 110 by stand pipe or withdrawal conduit means communicating with a bottom portion of riser 50. Also the spent catalyst may be charged to a bottom portion of bed 84 and withdrawn from an upper portion of the bed for downward flow through the cooler 102.

In yet another embodiment, it is contemplated modifying the regenerator arrangement of FIG. 111 by replacing the grid means 120 and passageways with a solid baffle member penetrated by upwardly extended one or more flue gas transfer tube means such as a plurality of flue gas flow through tube means, open in the bottom end thereof to the upper portion of the lower chamber 112 for flow of combustion flue gas products and any entrained particles of catalyst fines therethrough. The upper end of the flue gas transfer tube means preferably discharges in the upper portion of bed 84 through a downward curved tube end thereof resembling the handle of a cane for downward discharge from the upper end thereof into an upper portion of catalyst bed 84 whereby back flow of catalyst particles from bed 84 to the lower regeneration zone and bed 110 is substantially completely avoided. On the other hand the upper end of the vertical tube penetrating the baffle 120 may be capped on its upper open end by a large diameter downwardly extended tube means open in the bottom annular end thereof which will permit discharge of conveyed flue gases through the formed annular section into an upper portion of bed 84 to prevent back flow of catalyst particles downwardly through the flue gas conveying tube.

In yet another aspect, the oil feed injection system discussed with respect to FIG. II may be employed for preparation and injection of the partially decarbonized oil feed charged to riser 50 of FIG. III at feed inlet points represented by 60, 68 or a lower feed inlet point not shown.

FIG. IV is a cross sectional view of the bayonet tube cooler layout in combination with a plurality of spaced apart fluidizing gas distributor inlet tubes. The bayonet tube bundles diagrammatically shown as circles compress bayonet type tube construction consisting of 136 pairs of concentric tubes means shown more clearly in FIG. V. The inner tubes are equipped with tube guides resembling fins to maintain the tubes in concentric alignment with the outer tubes. The outer tube of each bayonet tube means is provided with an open spacing means permitting catalyst particle flow therethrough which maintain the tubes generally vertically jextapositioned to one another within the heat exchanger in a desired spaced relationship. The plurality of horizontally spaced apart fluidizing gas means 93 may be inverted "V" shaped channels or tubular means provided with openings in a bottom portion thereof for discharging a relatively low velocity fluidizing or catalyst fluffing gas between at least every second row of the plurality of spaced apart heat exchange conduits 83–85. The grid means used to space apart the tubes maintains a loose spacing with the vertical conduits. The grid means is not particularly shown since any means suitable for the purpose and permitting free flow of the catalyst solids downwardly through the heat exchanger or cooler may be used. In a more particular aspect, the heat exchanger is designed for a pressure of about 600 psi at 500° F. employing a heat exchange tubular arrangement comprising 1⅜ inch O.D. tubes of 3/16 inch wall thickness for the inner tubes 83 in combination with outer tubes 85 of a diameter which will provide an annular passageway which is at least ¼ inch wide. The bayonet type elongated tubes above described are spaced substantially horizontally in a square grid system of about 4.5 to 5 inches between cross marks coinciding with the central vertical axis of each tube system, thereby providing about 2 inches between tubes.

FIG. V more particularly identifies the apparatus of the solids cooler systems of FIGS. II and III and represented by coolers 53 and 102. The coolers may be of the same or a different size with respect to length and diameter, the number of heat exchanger tubes employed and the flow of solid particulate material therethrough. However, the general configuration and design is the same for each cooler of the regeneration operation in which employed. In the apparatus arrangement of FIG. V there is shown diagrammatically a fluidizable solids cylindrical cooler means comprising a shell 53 provided with a plurality of upwardly extending bayonet type heat exchange tubes comprising an inner tube 83 coaxially positioned within an outer tube 85. The open ended inner tubes 83 are in open communication at the top with the outer larger diameter tube 85 and at the bottom thereof with a header chamber 101. The inner tubes are provided with a plurality of vertically spaced apart fin tube guides 87 shown as dark means and the outer tubes communicate in a bottom annular open end with a separate header chamber 103 positioned above header chamber 101. The outer tubes 85 are provided with spacing support generally represented by means 89. Fluidizing gas inlet means 91 and 93 shown in FIG. IV as means 93 are connected to the fluidizing gas horizontal distributor means extending across the cooler cross section shown in FIG. IV.

The solids, be they inert or catalytic enter the top open end of the cylindrical cooler by arrows 95. The solid pass downwardly through the cooler comprising the bundle of upwardly extending spaced apart tubes in indirect contact heat exchange relationship with the outer tube 85 surface of the combustion of tubes. The partially cooled solids are removed from a lower portion of the cooler by side withdrawal conduit or flange means 97 which communicate with a stand pipe 59, for example, of FIG. III. Boiler feed water is charged to the bottom of the cooler by conduit 99 to header chamber 101 and thereafter distributed for passage upwardly through the inner tube 83 of the concentrically arranged substantially vertical heat exchange tubes. The boiler feed water is passed under pressure upwardly in the inner tube 83 and overflows the open upper end thereof into the annular space formed by tube 85. It passes in liquid phase condition downwardly through the annular section formed with the outer tube in indirect heat exchange contact with hot solids on the outer side of tube 85 and thence into a water-steam collecting header chamber 103 of elevated pressure positioned between the bottom of the downwardly flowing bed of solids and the bottom header chamber 101. The water-steam mixture thus formed of desired elevated pressure in the range of 150 to 500 psig and a temperature of about 232° C. to 260° C. (450° F. to 500° F.) is maintained at a water-steam ratio of at least 3 in the annular section of the heat exchanged tubes and is removed therefrom by conduit 105 as represented by conduit 57 of FIG. II and conduit 106 of FIG. III. By this solids cooler arrangement low and/or high pressure steam may be formed substantially as desired to recover heat generated by the partially regeneration solids. Pipe means 107, referred to as a blowdown connection is used to scavenge the header compartment 103 of any undesired collected material.

It is comtemplated passing the hot solid particle material whether inert or catalytic downwardly through the cooler as a relatively dense downwardly flowing fluid mass of solid particles of a concentration of at least about 35 or more pounds per cubic foot and flowing generally countercurrent to a low velocity fluidizing gas to maintain solids flow and charged by the plurality of distributor tubes means 93 and 91 discussed above. The concentration of solids flowing downwardly within the cooler is selected to particularly optimize a desired heat recovery from the downward flow solids in heat exchange arrangement provided with the plurality of heat exchange tubes. The downwardly flowing solids scour the outer tube surface for high heat exchange efficiency. In this heat exchange apparatus arrangement and environment, it is contemplated employing a distribution of solid particles in the range of about 30 microns up to about 150 microns and preferably of an average particle size in the range of 50 to 100 microns. In one specific operating arrangement associated with the system of FIG. III, it is contemplated charging partially regenerated catalyst to the top of the catalyst cooler at a temperature of about 704° C. or 732° C. (about 1300° F. or 1350° F.) and withdrawing it from the cooler reduced by an amount of at least about 50, more preferably reduced by about 50 to 400 degrees, and most preferably by about 50 to 150 degrees before passage to the lower catalyst regeneration zone. It is contemplated sizing the cooler to accommodate the passage of solids therethrough in substantially any desired amount. That is an amount in the range of about 10 to 30 tons/minute and counter-current to fluidizing or fluffing gas is contemplated.

Having thus generally described the improved methods and apparatus of the invention and discussed specific examples in support thereof it is to be understood that no undue restrictions are to be imposed by reasons thereof except as defined by the following claims.

What is claimed is:

1. In a method for regenerating solid particulates in a regenerator comprising a upper regeneration zone containing particulates and a lower regeneration zone containing particulates, the improvement comprising:
    (a) Passing downwardly at least a portion of said particulates in said upper zone through a substantially vertical cooling zone having a plurality of substantially parallel upwardly extending bayonet style heat exchanger means comprising coaxial tubes comprising an internal and an external coaxial conduit, capable of transferring heat exchange material upwardly through said internal coaxial conduit from a liquid heat exchange material inlet means and returning through said external coaxial conduit means a mixture of liquid and vapor heat exchange material to a lower portion of said cooling zone which is above said liquid heat exchange material inlet means and wherein said vertical cooling zone is in direct fluid communication both with said particulates in said upper regeneration zone and with particulates in said lower regeneration zone whereby said particulates is cooled by at least about 50° F. in said cooling zone;
    (b) Passing a heat exchange fluid through said liquid heat exchange material inlet means and withdrawing a liquid and vapor mixture resulting from indirect heat exchange with particulate passing through said substantially vertical cooling zone;
    (c) Passing fluidizing gas through said cooling zone external to said heat exchanger means to cause a counter flow of said fluidizing gas with respect to flow of said particulates from said upper regeneration zone;
    (d) Recovering combustion product flue gases from said lower regeneration zone, and using said combustion product flue gases in the presence of a combustion gas and said fluidizing gas from said cooling zone to regenerate the particulates in said upper zone; and
    (e) Passing the resulting regenerated particulates from said upper zone of said regenerator to a riser reactor.

2. The process of claim 1, wherein the first stage of solid particle regeneration is accomplished in said upper regeneration zone with an oxygen lean regeneration gas effecting partial combustion of hydrocarbonaceous deposits on said solid particle and at least a portion of the partially regenerated solid particle is cooled in said cooling zone by an amount within the range of 50° to 400° F. before passage to the second stage of regeneration in said lower regeneration zone.

3. In a process for regenerating zeolite cracking catalyst from a riser contact zone by combustion of carbonaceous deposits thereon in a regenerator comprising an upper regeneration zone containing said catalyst and a lower regenerator zone containing said catalyst, the improvement comprising:
    (a) passing downwardly at least a portion of said catalyst in said upper zone through a substantially vertical cooling zone having therein a plurality of substantially parallel upwardly extending bayonet heat exchanger means comprising coaxial tubes comprising an internal and an external coaxial conduit, capable of transferring heat exchange fluid upwardly through said internal coaxial conduit from a liquid heat exchange fluid inlet means and returning through said external coaxial conduit means a mixture of liquid and vapor heat exchange fluid to a lower portion of said cooling zone which is above said liquid heat exchange fluid inlet means and wherein said vertical cooling zone is in direct fluid communication both with said zeolite cracking catalyst in said upper regeneration zone and with said zeolite cracking catalyst in said lower regeneration zone whereby said catalyst is cooled by about 50° to 400° F. in said cooling zone;
    (b) passing a heat exchange fluid through said liquid heat exchange fluid inlet means and withdrawing a liquid and vapor mixture resulting from indirect heat exchange with catalyst passing through said substantially vertical cooling zone;
    (c) passing a fluidizing gas through said cooling zone external to said heat exchanger means to cause a counter flow of said fluidizing gas with respect to flow of said catalyst from said upper regeneration zone;
    (d) recovering combustion product flue gases from said lower regeneration zone, and using said combustion product flue gases in the presence of said fluidizing gas from step (c) to regenerate said catalyst in said upper zone; and
    (e) passing the resultant regenerated zeolite cracking catalyst from said lower zone of said regenerator to the bottom portion of a riser.

4. The process according to claim 3, wherein the first stage of regeneration in said upper regeneration zone is at a temperature which is maintained below 1,350° F. (732° C.) and the second stage of regeneration in said lower regeneration zone is at a temperature which is maintained below 1,500° F. (815° C.).

* * * * *